United States Patent [19]
Aubert et al.

[11] 3,812,250
[45] May 21, 1974

[54] ANTIFUNGAL SUPPOSITORY AND METHOD OF TREATING FUNGUS INFESTATIONS

[76] Inventors: Emilien Aubert, 3105 Rue Fendall, Montreal, Quebec; Jacques Des Rosiers, 6284 Rue Cairns, Ville D'Anjou, Quebec, both of Canada

[22] Filed: Mar. 4, 1971

[21] Appl. No.: 121,217

[52] U.S. Cl................ 424/148, 424/360, 424/363
[51] Int. Cl............................ A61j 3/08, A61k 9/02
[58] Field of Search................... 424/148, 360, 363

[56] References Cited
UNITED STATES PATENTS
3,234,091   2/1966   Lang et al............................ 424/14

OTHER PUBLICATIONS

Whitworth et al., JAPhA 48:353-5 (1959), "A Study of the Effect of Some Emulsifying Agents on Drug Release From Suppository Bases."

Wilson et al., American Drug Index (1970), J. B. Lippincott Co., Philadelphia, Pa., pp. 90–91, Boric Acid, pp. 246, Gentian Violet Supprettes, pp. 301, Jeneen Premeasured Liquid Douche, pp. 322, Lorophyn Suppositories and Jelly.

*Primary Examiner*—Shep K. Rose
*Attorney, Agent, or Firm*—Stevens, Davis, Miller & Mosher

[57] ABSTRACT

A vaginal suppository comprising gentian violet in an amount of 0.000017 to 0.001 weight percent, boric acid in an amount of 1 to 5 weight percent, gelatin in an amount of 15 to 35 weight percent, a non-ionic surfactant of the octylphenoxyethanol type, in an amount of 0.05 to 1 weight percent, and water. Also disclosed is a method of treating vaginal fungus infestations comprising administering a vaginal suppository having the above composition. It should be administered daily before bed time.

9 Claims, No Drawings

ANTIFUNGAL SUPPOSITORY AND METHOD OF TREATING FUNGUS INFESTATIONS

This invention relates to a composition for treating fungal infections and pruritis, particularly in connection with vaginal infestations. It has found particular applicability to infections by Moniliasis and Trichomonasis. Infestation by Candida Albicans is becoming more and more frequent in recent years. This is believed due to a wider use of contraceptive drugs, which appear to create optimum condition, for the growth of this microorganism, and due to pregnancies, where it is found in 30 percent of the women. Moniliasis is in the process of replacing Trichomonasis, which has been encountered very frequently in past years.

The actual specific drugs to eradicate Candida Albicans are still effective but seem to lose ground in curing the infestation beside the fact that the treatment is bothersome, long and quite often must be repeated two or three times if not more.

The present inventors have developed a novel composition and method of treatment with which it is possible to treat such infections in a relatively shorter time, with an especially rapid decrease in pruritis.

In an operative form, the present invention forms a vaginal suppository. The previously known products of this type had significant disadvantages in use. Previous products tended to decompose incompletely and locally within the vagina, leaving some areas relatively untreated. The previously used foams and creams were obviously inconvenient to use as well as sometimes causing some pain.

It is an object of the present invention to provide an effective composition for treatment of vaginal infestations, especially by the use of a vaginal suppository, and a method of treatment involving the use of such suppositories.

The present invention therefore provides an antifungal and antipruritic composition comprising gentian violet, boric acid, a gelling agent, and water, said gentian violet being present in an amount of 0.000017 to 0.001 weight percent, said boric acid being present in an amount of 1 to 5 weight percent, said gelling agent being present in an amount of 15 to 35 weight percent, and yielding at room temperature a solid mixture with a melting point below body temperature, all weights based on the weight of the total composition. Such compositions will normally also include a surfactant. Such surfactant will preferably be a non-ionic surfactant and will be present in an amount of 0.05 to 1 weight percent. A particularly useful type of surfactant is the material known by the material "TRITON X 100" (trademark) being a non-ionic surfactant of the octylphenoxyethanol type. The gelling agent may be chosen from a suitable pharmaceutically acceptable gelling agent which is solid at room temperature, but which will melt below body temperature. Gelatin or agar may be used, but gelatin appears to be the gelling agent of choice. Such gelatin will preferably be in an amount of 18 to 25 weight percent and most preferably at about 20 weight percent.

The composition will normally be formed into a solid vaginal suppository having a melting point below about 95°F.

In a further aspect, the present invention provides a vaginal suppository comprising gentian violet in an amount of 0.000017 to 0.001 weight percent, boric acid in an amount of 1 to 5 weight percent, gelling agent in an amount of 15 to 35 weight percent, a surfactant in an amount of 0.05 to 1 weight percent, and water. Such a surfactant will normally have a length in the range of 7 to 12 cm., and a diameter of about 1 to 2 cm., and most preferably, the suppository will have a length of about 9 cm., and a diameter of about 1.2 cm.

In a preferred embodiment, such a suppository will have a weight of about 12 gms., wherein the gentian violet is present in an amount of about 0.0004 gms., the boric acid is present in an amount of about 0.5 gms., the surfactant is a non-ionic surface active agent of the octylphenoxyethanol type, and is present in an amount of about 0.01 gms., and gelatin is present in an amount of about 2.5 gms.

In a further aspect, the present invention provides a method of treating vaginal fungus infestations comprising administering a vaginal suppository having a composition as follows: gentian violet in an amount of 0.000017 to 0.001 weight percent, boric acid in an amount of 1 to 5 weight percent, gelling agent in an amount of 15 to 35 weight percent, a surfactant in an amount of 0.05 to 1 weight percent, and water, said suppository having a melting point below body temperature. In a preferred embodiment, such a suppository has a length in the range of 7 to 12 cm., and a diameter of about 1 to 2 cm. The suppository is preferably administered daily before bed time.

The gelatin which has been used by the present inventors is colorless or slightly yellow, transparent, brittle, and practically odorless and tasteless. It is obtainable in sheets, flakes, or coarse powder. It provides a suppository with suitable melting characteristics. For example, it is found that the solidification point is in the range of 82° to 85° F., and the melting point is in the range of 90° to 95°F.

The surface active agent will normally be a non-ionic one, such as a member of the TRITON (trademark) series, which is an octylphenoxyethanol type material. TRITON X-100 (trademark) has been the material of choice. It is possible to use other surfactants such as TWEEN (trademark) and SPAN (trademark) which are complex esters and ester ethers formed from hexahydric alcohols, alkylene oxides and fatty acids.

The suppository is conveniently formed in a disposable injection unit consisting of a cylinder and piston. It will normally be important to use a disposable unit so as to reduce the possibility of re-infection. The suppository in the unit may be retained at room temperature until use, but it is preferable to keep it under refrigeration, for example at about 4°C. In order to apply the suppository from the applicator, it may be desirable to pass the applicator under a current of hot water for a few seconds, or place it in a hot wet towel. This will slightly liquify the surface of the product and facilitate the discharge of the suppository into the vagina by pushing the piston.

Gentian violet is a quaternary ammonium halide sometimes known as hexamethyl para rosaniline chloride, which is described on page 484, 486 of the Merck Index. Its use in the treatment of fungal infections is known, but it has previously been used in rather higher concentrations. Gentian violet is very suitable for the present use since it is mildly basic and is accordingly taken up quickly by the cells. It is capable of killing bacteria and fungus and is considered an antiseptic material. It has a strong dyeing action and can result in unpleasant coloration and stains, if used carelessly. This makes all the more important the use of a gelatin if the material is to be employed by the patient himself. Gentian violet is found to have a fungicidal action at dilutions as high as 1 to 60,000. The preferred range of concentration is between 1/20,000 to 1/50,000. In developing the present invention, the present inventors have found that 1 part in 33,000 gives an excellent antiseptic and fungicidal effect.

Boric acid has some antiseptic, fungicidal, and bacteriostatic effect. It is also very important for its antipruritic effect. The boric acid may be present in the composition to an extent of 1 to 5 weight percent, more usually 2 to 4 percent, and a preferred concentration is about 4 percent.

The suppository is designed to take into account the anatomical dimensions of the vagina. This is considered important so as to maximize the uniformity of treatment.

In a preferred aspect, the present invention relates to a suppository which has a length of 8 to 10 cm., and a diameter of about 1.2 cm. With such dimensions, the suppository will be in contact with almost the entire wall of the vaginal cavity.

By the use of the present invention, it is found that treatment can be carried out in an unusually short time, such as 7 days, as opposed to the customary treatment which generally is known to take about 15 days. The present mixture of ingredients does not produce appreciable vaginal irritation or any idiosyncrasy in the patient. The use of the present invention furthermore does not appear to interfere with the carrying out of sexual relations during the time of treatment. The application of the suppository in accordance with the present invention is not painful or troublesome for the patient. Prior treatments have been found to give difficulty in this regard, particularly since the mucous membranes involved are inflamed and sensitive.

EXAMPLES

Example 1

In this example, preparation of a suppository in accordance with a preferred embodiment of this invention is set forth. The ingredients are as follows:

Gentian violet (methylrosaniline N.F.V.) — 0.000396 gms.
Boric acid ($H_3BO_3$ U.S.P. X 1) — 0.48 gms.
TRITON X-100 (trademark of Rohm & Haas Company, Philadelphia for a non-ionic surfactant) — 0.012 c.c.
Granular gelatin — 2.64 gms.

This material was mixed with water to give a total weight of 12 gms. and was formed into a suppository 9 cm. in length and 1.2 cm. in diameter. The suppository was found to have a solidification point of 28° to 30°C. or 82° to 85°F., and a melting point of 32° to 35°C. or 90° to 95°F. Suppositories made in accordance with this formula were found to be very effective against fungus and other organisms such as Candida Albicans, in culture tests on Sabouraud maltose agar, and in clinical tests.

Example 2

A suppository as produced according to Example 1 was used to overcome an infestation due to Candida Albicans during a period of 7 days at a dosage of one suppository per day, applied at the time when the patient was going to bed for the night. The patient also applied a vaginal douche made of 2 tbsp. of table salt per quart of lukewarm water every second day during the active treatment.

Of 39 patients from whom cultures of vaginal secretions were taken when the symptamology oriented the doctors' diagnosis towards a monilial infestation, 31 patients were later found to have a positive culture and eight patients had a negative culture.

Twenty-four patients who had a first positive culture received a 7-day treatment consisting in seven suppositories. One patient who had a negative culture received the same treatment. Seven patients did not come in consultation after a positive culture to receive their treatment. Finally, seven patients who had a negative culture did not receive the treatment.

Between 2 and 5 days after the last suppository, control cultures were taken and sent to the hospital laboratories. If needed, more cultures were taken either to differentiate the Candida Albicans or control its long time effect upon the vaginal flora. Four cultures on four patients were taken at 1 or 2 months of intervals.

Results:

Twenty patients did negativate their vagina to Candida Albicans after 7 days of treatment, and one patient, who did not respond well, was again cultured. The specimen found was Candida Stellatoidea. A new treatment was begun and after the 7-day treatment, the Stellatoidea infestation disappeared. One month after that last negative culture, the vaginal secretions were still normal at the culture.

These 21 patients out of 24, who negativated their vaginal secretions to Candida Albicans constitutes 87.5 percent of frank success in 7 days of treatment.

Three patients did not negativate their cultures after 7 days of treatment and their specimens were studied for differentiation. One Candida Krusei, one resistant Stellatoidea which surrendered after a second treatment (reported in the above group), one Stellatoidea and one Candida Albicans which seemed resistant.

Almost all cultures of the Candida Albicans had an antibacterial study made either to some known antimonilial agents or to the present suppository.

With the present suppository, the inhibition zones were constantly found between 34 and 45 mm. of inhibition. The resistant group was also studied and we found the effects, shown in Table 1.

TABLE 1

| Patient No. | |
|---|---|
| 6 | 1st culture: 39 mm. of inhibition zone; 2nd culture: krusei: 30 mm.; 3rd culture: 42 mm. inhibition. Culture still positive. |
| 8 | 1st culture: 39 mm.; 2nd culture: Stellatoidea: 40 mm.; no treatment. 3rd culture: Stellatoidea: 42 mm.; 2nd treatment: negative culture repeated one month later and found negative; |
| 16 | 1st culture: 40 mm.; 2nd culture: Stellatoidea; no more treatment. |
| 33 | 1st culture: 34 mm.; 2nd culture: Candida Albicans: 44 mm.: no more treatment. |

In all the other patients who did respond well to the 7 days of medication, the first inhibition zone was above 35 mm. of inhibition. It is, of course, possible that some of these three resistant patients may not have taken the treatment as recommended or did not take it at all.

There was no irritation reported from the treatment which was very well accepted by the patients. The irritation and itching accompanying the monilial infestation disappeared in 2 or 3 days after the beginning of the medication, even in some "resistant" infestations.

Sexual relations were not postponed until after the treatment and the patients or their husbands did not complain of the situation, despite the coloration of the vaginal secretions. The patients inserted the suppositories on retiring and they were invited to wear paper cloth on the perineal region for the night. No one complained about coloration of clothes or bed linen.

The patients experienced relief from their symptomatology at the very start of the treatment. Some patients had experienced symptoms of the infestation continuously for 2 years, even after using all the creams, suppositories, or fluids available. Often they had seen doctors and specialists without good results. Our patients did not stop the use of their contraceptives and the four pregnant patients had relief until the end of their pregnencies.

The present inventors feel this form of treatment is excellent against an increasing frequency of infestation among the female population. This form of treatment effective at 87.5 percent in 7 days of treatment will encounter the general acceptance because it is short in duration and brings early relief of the irritation and itching due to Candida Albicans.

Table 2 shows the results of the clinical tests discussed above.

Table 2

| | | |
|---|---|---|
| A | First culture positive; treatment of seven days: | 24 patients |
| | First culture negative; treatment of seven days: | 1 patient |
| | First culture positive; no treatment | 7 patients |
| 7 | First culture negative; no treatment | 7 patients |
| | | 39 patients |
| B | First culture positive; 7 days of treatment; 2nd culture negative | 20 patients |
| | First culture positive; 7 days of treatment, 2nd culture positive 2nd treatment; 3rd. culture negative; 4th culture negative | 1 patient |
| | | 21 patients |
| C | First culture positive, 7 days of treatment; 2nd culture positive: | |
| | Patient No. 6: Krusei (inhibition zones: 39–30–42) | |
| | Patient No. 16: Stellatoidea (inhibition: 40 mm) | |
| | Patient No. 33: Candida albicans (inhibition 34–44) | |
| | 3 patients | |
| D | Excellent results: | 21 patients: 87.5% |
| | Failure: | 3 patients:12.5% |
| | | 100 % |

We claim:

1. A vaginal suppository consisting essentially of gentian violet, boric acid, 0.05–1 percent by weight a surfactant, gelatin or agar as a gelling agent, and water, said gentian violet being present in an amount of 0.000017 to 0.001 weight percent, said boric acid being present in an amount of 1 to 5 weight percent, said gelling agent being present in an amount of 15 to 35 weight percent, all weights based upon the weight of the total composition, said composition being antifungal and antipuritic, solid at room temperature but melting below body temperature, and said suppository having a length in the range of 7 to 12 cm. and a diameter of about 1 to 2 cm.

2. A suppository as in claim 1 wherein the suppository has a melting point below about 95°F.

3. A suppository as in claim 1 wherein the gelling agent is gelatin and is present in an amount of 18 to 25 weight percent.

4. A suppository as in claim 1 wherein the amount of gelatin is about 20 weight percent.

5. A suppository as in claim 1 wherein the suppository is about 9 cm. in length and 1.2 cm. in diameter.

6. A suppository as in claim 5 having a weight of about 12 gms., wherein the gentian violet is present in an amount of about 0.0004 gms., the boric acid is present in an amount of about 0.5 gms., the surfactant is a non-ionic surface active agent of the octylphenoxyethanol type and is present in an amount of about 0.01 gms., and gelatin is present in an amount of about 2.5 gms.

7. A method of treating vaginal fungus infestations comprising administering a vaginal suppository in accordance with claim 1 having a composition as follows: gentian violet in an amount of 0.000017 to 0.001 weight percent, boric acid in an amount of 1 to 5 weight percent, gelling agent in an amount of 15 to 35 weight percent, a surfactant in an amount of 0.05 to 1 weight percent, and water, said suppository having a melting point below body temperature.

8. A method as in claim 7 wherein the suppository has a length in the range of 7 to 12 cm. and a diameter of about 1 to 2 cm.

9. A method as in claim 8 wherein the suppository is administered daily before bed time.

* * * * *